(12) United States Patent
Bruchmann et al.

(10) Patent No.: US 8,853,331 B2
(45) Date of Patent: Oct. 7, 2014

(54) HIGHLY FUNCTIONAL, HYPERBRANCHED POLYCARBONATES AND PRODUCTION AND USE THEREOF

(75) Inventors: Bernd Bruchmann, Freinsheim (DE); Jens Aβmann, Mannheim (DE); Claudius Schwittay, Antwerp (BE); Harald Schäfer, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/229,094

(22) Filed: Sep. 9, 2011

(65) Prior Publication Data

US 2012/0065328 A1 Mar. 15, 2012

Related U.S. Application Data

(63) Continuation of application No. 12/373,299, filed as application No. PCT/EP2007/057427 on Jul. 18, 2007, now abandoned.

(30) Foreign Application Priority Data

Jul. 26, 2006 (EP) ..................................... 06117852

(51) Int. Cl.
C08G 64/30 (2006.01)
C08G 64/02 (2006.01)

(52) U.S. Cl.
CPC ............ C08G 64/302 (2013.01); C08G 64/305 (2013.01); C08G 64/0216 (2013.01); C08G 64/0225 (2013.01)
USPC ........... 525/465; 525/462; 525/469; 528/370; 528/371; 528/372

(58) Field of Classification Search
None
See application file for complete search history.

(56) References Cited

U.S. PATENT DOCUMENTS

| | | | |
|---|---|---|---|
| 3,959,291 A | 5/1976 | Cook | |
| 4,087,404 A | 5/1978 | Cook | |
| 5,442,071 A * | 8/1995 | Galbo et al. | 546/207 |
| 7,521,521 B2 | 4/2009 | Bruchmann et al. | |
| 2008/0045668 A1* | 2/2008 | Eibeck et al. | 525/398 |
| 2010/0035065 A1 | 2/2010 | Terrenoire et al. | |
| 2013/0203958 A1* | 8/2013 | Pottie et al. | 528/405 |

FOREIGN PATENT DOCUMENTS

| | | |
|---|---|---|
| JP | 9-40948 | 2/1997 |
| JP | 9 143161 | 6/1997 |
| JP | 10-306156 | 11/1998 |
| JP | 2000-095853 | 4/2000 |
| JP | 2000 95853 | 4/2000 |
| WO | 01 48057 | 7/2001 |
| WO | 02 092668 | 11/2002 |
| WO | 2006 042673 | 4/2006 |
| WO | WO 2006042673 A1 * | 4/2006 |

OTHER PUBLICATIONS

Bolton, Daniel H. et al., "Synthesis and Characterization of Hyperbranched Polycarbonates", Macromolecules vol. 30, No. 7, pp. 1890-1896, XP-000684813, (1997).
Scheel, Arnulf et al., "Hyperbranced Thermolabile Polycarbonates Derived from a $A_2$-$B_3$ Monomer System", Macromol. Symp. vol. 210, pp. 101-110, XP-0002458096, (2004).
Bergenudd, Helena et al., "Synthesis and evaluation of hyperbranched phenolic antioxidants of three different generations", Polymer Degradation and Stability, Elsevier, vol. 76, pp. 503-509, (2002).
Mingbo Ynag et al.; "China Materials Engineering Canon"; Macromolecular Materials Engineering; Chemical Industry Press; Mar. 2006; vol. 6; pp. 446-454.

* cited by examiner

*Primary Examiner* — Randy Gulakowski
*Assistant Examiner* — Rachel Kahn
(74) *Attorney, Agent, or Firm* — Oblon, Spivak, McClelland, Maier & Neustadt, L.L.P.

(57) ABSTRACT

Hyperbranched polycarbonates having stabilizing groups, prepared by reaction of
(a) at least one compound having at least three alcoholic hydroxyl groups per molecule with
(b) at least one reagent of the general formula I

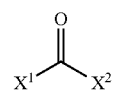

I (c) and at least one reagent of the general formula $X^3$-$(A^1)_m$-$X^4$,
where the variables are defined as follows:
$X^1$, $X^2$ are identical or different and are selected from among halogen, $C_1$-$C_{10}$-alkoxy, $C_6$-$C_{10}$-aryloxy and O—C(=O)-halogen,
$X^3$ is a functional group selected from among OH, SH, $NH_2$, NH—$C_1$-$C_4$-alkyl, iso-cyanate, epoxy, COOH, $COOR^{12}$, C(=O)—O—C(=O), C(=O)—Cl,
$R^{12}$ is $C_1$-$C_4$-alkyl or $C_6$-$C_{10}$-aryl,
$A^1$ is a spacer or a single bond,
m is zero or one.
$X^4$ is a group selected from among phenol groups, benzophenones, aromatic amines and nitrogen-comprising heterocycles, in each case substituted or unsubstituted.

20 Claims, No Drawings

HIGHLY FUNCTIONAL, HYPERBRANCHED POLYCARBONATES AND PRODUCTION AND USE THEREOF

CROSS REFERENCE TO RELATED APPLICATION

This application is a continuation of U.S. application Ser. No. 12/373,299, filed on Jan. 12, 2009, now abandoned which is a 371 of PCT/EP07/057427, filed on Jul. 18, 2007, and claims priority to European Patent Application Ser. No. 06117852.1, filed on Jul. 26, 2006.

The present invention relates to high-functionality, hyperbranched polycarbonates having stabilizing groups, prepared by reaction of
(a) at least one compound having at least three alcoholic hydroxyl groups per molecule with
(b) at least one reagent of the general formula I

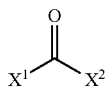

(a) and at least one reagent of the general formula $X^3\text{-}(A^1)_m\text{-}X^4$,
where the variables are defined as follows:
$X^1$, $X^2$ are identical or different and are selected from among halogen, $C_1$-$C_{10}$-alkoxy, $C_6$-$C_{10}$-aryloxy and O—C(=O)-halogen,
$X^3$ is a functional group selected from among OH, SH, $NH_2$, NH—$C_1$-$C_4$-alkyl, iso-cyanate, epoxy, COOH, $COOR^{12}$, C(=O)—O—C(=O), C(=O)—Cl,
$R^{12}$ is $C_1$-$C_4$-alkyl or $C_6$-$C_{10}$-aryl,
$A^1$ is a spacer or a single bond,
m is zero or one,
$X^4$ is a group selected from among phenol groups, benzophenones, aromatic amines and nitrogen-comprising heterocycles, in each case substituted or unsubstituted.

The hyperbranched polycarbonates of the invention can be used, inter alia, as termination agents in the preparation of thermoplastics or thermosets, for stabilizing thermoplastics and thermosets against, for example, oxidative, thermal or radiation-induced degradation, also as additive in surface coating systems and coatings.

Multifunctional stabilizers against thermal and oxidative decomposition are known from WO 01/48057. They can be obtained by, for example, amidation of polyamines such as tris-(2-aminoethyl)amine or dendrimers such as 4-cascade:1,4-diaminobutane[4]:propylamine with 3-para-phenolpropionic acid derivatives. The substances described can be obtained only by means of multistage reactions. In addition, they are generally substances which are viscous or are solid at room temperature and are therefore difficult to meter.

WO 02/092668 describes hyperbranched or dendritic polymers which are derived from multifunctional monomers and comprise, for example, covalently bound oxidation stabilizers or thermal stabilizers. Hyperbranched or dendritic polymers derived from multifunctional monomers which are proposed are, for example, polyesters derived from 1,1-dimethylolpropionic acid or polyethylene glycol and 1,1-dimethylolpropionic acid. The dendritic or hyperbranched polymers disclosed which comprise, for example, covalently bound oxidation stabilizers or thermal stabilizers display a low tendency to migrate or effloresce. However, such dendritic or hyperbranched polyesters which comprise, for example, covalently bound oxidation stabilizers or thermal stabilizers are usually either very viscous or solid and in many cases, particularly in the production of clear varnishes, difficult to meter and difficult to mix with one another.

E. Malmstroem Jonsson et al. (Polymer Degradation and Stability 2002, 76, 503-509) describe the preparation of dendritic polyesters which are based on 1,1-dimethylol-propionic acid and pentaerythritol and are modified with phenolic antioxidants. The resulting products are obtained as yellow solids.

It was an object of the present invention to provide stabilizers which avoid the disadvantages known from the prior art, are effective against various damage mechanisms and have advantageous properties. The stabilizers should be effective against damage by UV radiation, heat, hydrolysis, oxygen or ozone and have one or more of the following advantageous properties, namely
  have a low volatility
  do not tend to effloresce or bleed,
  are not washed out of the polymer,
  are readily miscible and able to be incorporated,
  have a high active group concentration based on the total weight of the stabilizer,
  can be emulsified or dissolved according to the application in a liquid component,
  can be synthesized readily and by identical or similar methods.

A further object was to provide stabilizers which are suitable, in particular, for producing thermoplastics or thermosets, coatings or surface coating systems.

Polyoxymethylene homopolymers and copolymers (POMs, also known as polyacetals) are obtained by polymerization of formaldehyde, 1,3,5-trioxane (trioxane for short) or another formaldehyde source, with comonomers such as 1,3-dioxolane, 1,3-butanediol formal or ethylene oxide being additionally used for preparing copolymers. The polymers are known and have a number of excellent properties, so that they are suitable for a wide variety of industrial applications.

The polymerization is usually carried out cationically; for this purpose, strong protic acids, for example perchloric acid, or Lewis acids such as tin tetrachloride or boron trifluoride are introduced into the reactor as initiators (catalysts). The polymerization can advantageously be carried out in the melt, cf., for example, EP 0 080 656 A1, EP 0 638 357 A2 and EP 0 638 599 A2.

The reaction is then usually stopped by introduction of basic deactivators. The deactivators used hitherto are basic organic or inorganic compounds. The organic deactivators are monomeric compounds, for example amines such as triethylamine or triacetonediamine, alkali metal or alkaline earth metal salts of carboxylic acids, for example sodium acetate, alkali metal or alkaline earth metal alkoxides such as sodium methoxide or alkali metal or alkaline earth metal alkyls such as n-butyllithium. The boiling or decomposition point of these organic compounds is usually below 170° C. (1013 mbar). Suitable inorganic deactivators are, inter alia, ammonia, basic salts such as alkali metal and alkaline earth metal carbonates, e.g. sodium carbonate, or hydroxides and also borax, which are usually used as a solution.

The conversion in the polymerization is usually not complete; rather, the crude POM polymer usually still comprises up to 40% of unreacted monomers. Such residual monomers are, for example, trioxane and formaldehyde and also any comonomers which have been concomitantly used, e.g. 1,3-dioxolane, 1,3-butanediol formal or ethylene oxide. The residual monomers are separated off in a degassing apparatus.

It would be economically advantageous to recirculate them directly to the polymerization.

However, the residual monomers which have been separated off are often contaminated with the deactivators and recirculation of these deactivator-comprising residual monomers to the reactor results in a deterioration in the product properties and slows down the polymerization or brings it to a complete stop. Owing to the abovementioned high boiling or decomposition point of the organic deactivators, these can generally not be separated off by simple distillation.

It is an object of the invention to remedy the disadvantages indicated. It is an object to discover a process for preparing POMs in which the deactivation is carried out in a simple manner and requires no subsequent measures such as purification of the recirculated residual monomers which impair the economics of the overall process.

The process should make it possible to add the deactivator in a simple manner, preferably in liquid form or dissolved in solvents which are inert under the process conditions.

In addition, the residual monomers should be able to be recirculated to the process in a simple manner, in particular without intermediate purification steps.

We have accordingly found the hyperbranched polycarbonates defined at the outset.

Hyperbranched polycarbonates according to the invention are molecularly and structurally nonuniform. They differ from dendrimers in, for example, their molecular nonuniformity and can be prepared with considerably less difficulty.

For the purposes of the present invention, hyperbranched polycarbonates are uncrosslinked macromolecules which have hydroxyl and carbonate or carbamoyl chloride groups and are nonuniform both structurally and molecularly. They can, in one variant of the present invention, be built up from a central molecule in a manner analogous to dendrimers but with a nonuniform chain length of the branches. In another variant of the present invention, they can be built up linearly with functional side groups or, as a combination of the two extremes, have both linear and branched parts of the molecule. For the definition of dendritic and hyperbranched polymers, see also P. J. Flory, J. Am. Chem. Soc. 1952, 74, 2718 and H. Frey et al., Chem. Eur. J. 2000, 6, No. 14, 2499.

In the context of the present invention, the term "hyperbranched" means that the degree of branching (DB) is from 10 to 99.9%, preferably from 20 to 99%, particularly preferably from 20 to 95%.

In the context of the present invention, the term "dendrimer" means that the degree of branching is 99.9-100%. For the definition of the "degree of branching", see H. Frey et al., Acta Polym. 1997, 48, 30.

The degree of branching (DB) of the substances concerned is defined as $$DB = \frac{T+Z}{T+Z+L} \times 100\%,$$

where T is the mean number of terminal monomer units, Z is the mean number of branched monomer units and L is the mean number of linear monomer units in the macromolecules of the respective substances.

Hyperbranched polycarbonates according to the invention having stabilizing groups can be obtained by reaction of
(a) at least one compound having at least three alcoholic hydroxyl groups, hereinafter also referred to as compound (a) or, depending on the number of alcoholic hydroxyl groups, as, for example, triol (a) or tetrol (a) or pentol (a), with
(b) at least one reagent of the formula I, hereinafter also referred to as reagent (b),

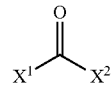

(c) and at least one reagent of the general formula $X^3$-$(A^1)_m$-$X^4$, hereinafter also referred to as reagent (c),
where the variables are defined as follows:
$X^1$, $X^2$ are identical or different and are selected from among halogen, for example bromine and in particular chlorine, $C_1$-$C_{10}$-alkoxy, preferably $C_1$-$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-butoxy and tert-butoxy;
$C_6$-$C_{10}$-aryloxy, in particular phenoxy, 1-naphthoxy, 2-naphthoxy or $C_1$-$C_4$-alkyl-substituted $C_6$-$C_{10}$-aryloxy, in particular o-tolyloxy or p-tolyloxy,
and O—C(=O)-halogen, in particular O—C(=O)—Cl.

Particularly preferred reagents (b) are dimethyl carbonate, diethyl carbonate, di-n-butyl carbonate, di-tert-butyl carbonate, di-tert-butyl dicarbonate, di-tert-butyl tricarbonate, diphenyl carbonate, ditolyl carbonate, phosgene, methyl chloroformate, diphosgene and triphosgene.

Compound (a) is selected from among compounds having at least three alcoholic hydroxyl groups, for example triols (a), tetrols (a) or pentols (a).

Examples of suitable triols (a) are aliphatic, aromatic and benzylic triols which may be unalkoxylated or have from one to 100 alkoxy units per hydroxyl group, preferably alkoxylated by means of $C_2$-$C_4$-alkylene oxide, for example ethylene oxide, propylene oxide or 1,2-butylene oxide or mixtures of ethylene oxide and propylene oxide and/or butylene oxide, and in particular alkoxylated by ethylene oxide or propylene oxide.

Examples which may be mentioned are: glycerol, trimethylolmethane, 1,1,1-trimethylol-ethane, 1,1,1-trimethylolpropane, 1,2,4-butanetriol, tris(hydroxymethyl)amine, tris(hydroxyethyl)amine, tris(hydroxypropyl)amine, tris(hydroxymethyl)isocyanurate, tris(hydroxyethyl)isocyanurate, phloroglucinol, trihydroxytoluene, trihydroxydimethyl-benzene, phloroglucides, 1,3,5-benzenetrimethanol, 1,1,1-tris(4'-hydroxyphenyl)-methane, 1,1,1-tris(4'-hydroxyphenyl)ethane, trifunctional or higher-functional polyetherols based on trifunctional or higher-functional alcohols and ethylene oxide, propylene oxide or butylene oxide, or polyesterols. Particular preference is given to glycerol, 1,1,1-trimethylolpropane and also polyetherols thereof based on ethylene oxide or propylene oxide.

As preferred examples, mention may be made of glycerol and (HO—$CH_2$)$_3$C—$X^7$, unalkoxylated or having from one to one hundred $C_2$-$C_4$-alkylene oxide units per hydroxyl group, where $X^7$ is selected from among a nitrogen atom and C—$R^6$ and $R^6$ is selected from among hydrogen and $C_1$-$C_4$-alkyl such as methyl, ethyl, n-propyl, isopropyl, n-butyl, isobutyl, sec-butyl and tert-butyl. Very particular preference is given to glycerol, trimethylolethane, trimethylolpropane, 1,2,4-butanetriol, monoethoxylated to decaethoxylated glycerol and monoethoxylated to decaethoxylated 1,1,1-trimethylol-propane ($R^6=C_2H_5$).

Examples of suitable tetrols (a) are pentaerythritol, bis(trimethylolpropane) and diglycerol, which may be unalkoxylated or have from one to 100 alkoxy units per hydroxyl group, preferably alkoxylated by $C_2$-$C_4$-alkylene oxide, for example ethylene oxide, propylene oxide or 1,2-butylene oxide or mixtures of ethylene oxide and propylene oxide and/or butylene oxide, and in particular alkoxylated by ethylene oxide or propylene oxide.

Examples of suitable pentols (a) also comprise compounds having more than 5 alcoholic hydroxyl groups per molecule. Mention may be made of triglycerol, polyglycerols, hexahydroxybenzene, or sugars such as sorbose, mannose or glucose, in particular reduced sugars such as sorbitol, which may be unalkoxylated or have from one to 100 alkoxy units per hydroxyl group, preferably alkoxylated by $C_2$-$C_4$-alkylene oxide, for example ethylene oxide, propylene oxide or 1,2-butylene oxide or mixtures of ethylene oxide and propylene oxide and/or butylene oxide, and in particular alkoxylated by ethylene oxide or propylene oxide.

Furthermore, the reaction also involves at least one reagent of the general formula $X^3$-$(A^1)_m$-$X^4$, for the purposes of the present invention also referred to as reagent (c), where
$X^3$ is a functional group selected from among OH, SH, $NH_2$, NH—$C_1$-$C_4$-alkyl, where $C_1$-$C_4$-alkyl is selected from among methyl, ethyl, n-propyl, isopropyl, n-butyl, isobutyl, sec-butyl and tert-butyl, for example NH—$CH_3$, NH—$C_2H_5$, NH-n-$C_3H_7$, NH-iso-$C_3H_7$, NH-n-$C_4H_9$, NH-iso-$C_4H_9$, NH-sec-$C_4H_9$, NH-tert-$C_4H_9$, also isocyanate, epoxy such as

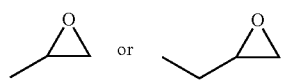

COOH, $COOR^{12}$, C(=O)—O—C(=O), C(=O)—Cl, preferably COOH, $COOR^{12}$, OH and $NH_2$,
$R^{12}$ is $C_1$-$C_4$-alkyl or $C_6$-$C_{10}$-aryl
$A^1$ is a single bond or a spacer, examples of spacers $A^1$ are para-phenylene, meta-phenylene, preferably $C_2$-$C_{100}$-alkylene, preferably $C_2$-$C_{50}$-alkylene, particularly preferably up to $C_{20}$-alkylene, branched or unbranched, with from one to 6 nonadjacent $CH_2$ groups optionally being able to be replaced in each case by a sulfur atom, including oxidized, or oxygen atom. Mention may be made by way of example of the following spacers:
—$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{12}$—, —$(CH_2)_{14}$—, —$(CH_2)_{16}$—, —$(CH_2)_{18}$—, —$(CH_2)_{20}$—, —$CH_2$—$CH(CH_3)$—, —$CH_2$—$CH(C_2H_5)$—, —$CH_2$—$CH(CH[CH_3]_2)$—, —$CH_2$—$CH(n$-$C_3H_7)$—, —$[CH(CH_3)]_2$—, —$CH(CH_3)$—$CH_2$—$CH_2$—$CH(CH_3)$—, —$CH(CH_3)$—$CH_2$—$CH(CH_3)$—, —$CH_2$—$C(CH_3)_2$—$CH_2$—, —$CH_2$—$CH(n$-$C_4H_9)$—, —$CH_2$—$CH(iso$-$C_3H_7)$—, —$CH_2$—$CH(tert$-$C_4H_9)$—,
—$CH_2$—O—, —$CH_2$—O—$CH_2$—, —$(CH_2)_2$—O—$(CH_2)_2$—, —$[(CH_2)_2$—O$]_2$—$(CH_2)_2$—, —$[(CH_2)_2$—O$]_3$—$(CH_2)_2$—,
—$CH_2$—S—, —$CH_2$—S—$CH_2$—, —$(CH_2)_2$—S—$(CH_2)_2$—, —$[(CH_2)_2$—S$]_2$—$(CH_2)_2$—, —$[(CH_2)_2$—S$]_3$—$(CH_2)_2$—, —$CH_2$—SO—$CH_2$—, —$CH_2$—$SO_2$—$CH_2$—, very particularly preferred spacers are $C_1$-$C_{10}$-alkylene groups, branched or unbranched for example —$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—,
m is zero or one,
$X^4$ is a group selected from among phenol groups, benzophenones, aromatic amines and nitrogen-comprising heterocycles, in each case substituted or unsubstituted.

Here, $X^4$ takes on the role of the stabilizing group.

Examples of phenol groups are, in particular, sterically hindered phenol groups, for example phenol groups substituted by one or two isopropyl groups or tert-butyl groups in the ortho position relative to the phenolic OH group. Particularly preferred examples of phenol groups are

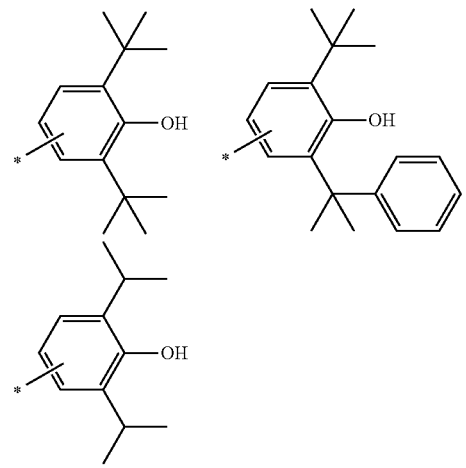

A very particularly preferred example of a phenol group is the 3-(3,5-di-tert-butyl-4-hydroxyphenyl)propionic acid group.

Examples of benzophenone groups are, in particular,

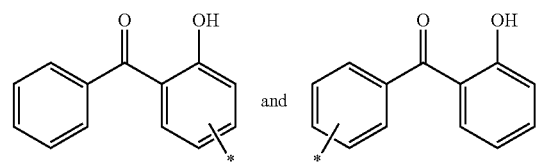

Examples of aromatic amines are

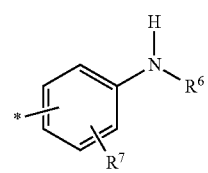

where the variables are defined as follows:
$R^6$ is selected from among hydrogen,
$C_1$-$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; particularly preferably $C_1$-$C_4$-alkyl such as methyl, ethyl, n-propyl, isopropyl, n-butyl, isobutyl, sec-butyl and tert-butyl, $C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl, $C_6$-$C_{14}$-aryl, for example 1-naphthyl, 2-naphthyl, 1-anthracenyl, 2-anthracenyl, 9-anthracenyl and in particular phenyl, benzyl;

$R^7$ is selected among hydrogen, $C_1$-$C_4$-alkyl, methyl, ethyl, n-propyl, isopropyl, n-butyl, isobutyl, sec-butyl and tert-butyl.

Nitrogen-comprising heterocycles can be aromatic, monounsaturated or saturated.

Nitrogen-comprising heterocycles can comprise one, two or three nitrogen atoms and can bear one or more substituents; in the case of aromatic heterocycles, preference is given to one or more hydroxyphenyl substituents.

Examples of aromatic heterocycles are benzotriazoles and triazines, in particular those of the formulae

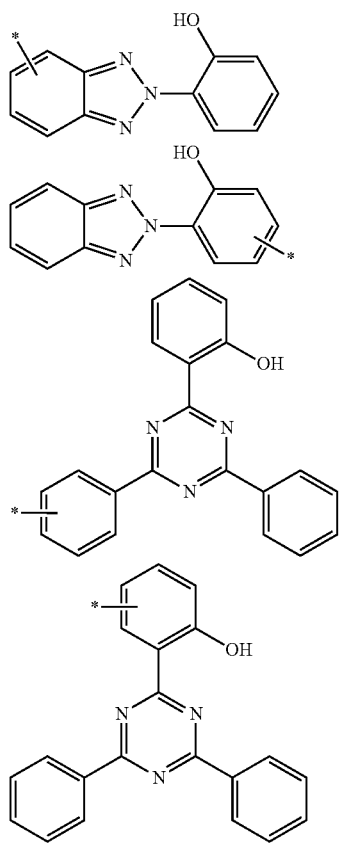

which may each bear one or more further substituents, for example hydroxyl or $C_1$-$C_4$-alkyl, in particular tert-butyl, also $C(CH_3)_2(C_6H_5)$ or $C(CH_3)_2OH$ or perfluoro-$C_1$-$C_4$-alkyl, in particular $CF_3$ or n-$C_4F_9$. Specific examples of nitrogen-comprising aromatic heterocycles having one or more substituents are

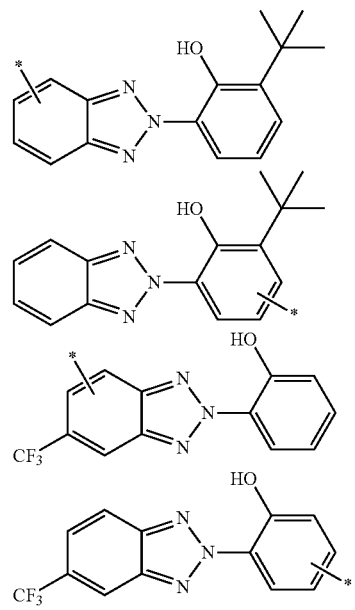

Examples of saturated nitrogen-comprising heterocycles are, in particular, the substituents which are known as HALS (hindered amine light stabilizers) and have the formula II a or the formula II b,

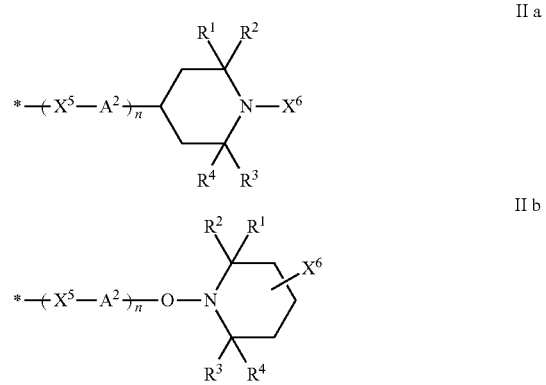

where the variables are defined as follows:

$R^1$, $R^2$, $R^3$ and $R^4$ are identical or different and are each, independently of one another, $C_1$-$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; particularly preferably $C_1$-$C_4$-alkyl such as methyl, ethyl, n-propyl, isopropyl, n-butyl, isobutyl, sec-butyl or tert-butyl, with particular preference being given to $R^1$, $R^2$, $R^3$ and $R^4$ being identical and each being methyl, $C_3$-$C_{12}$-cycloalkyl, such as cyclopropyl, cyclobutyl, cyclopentyl, cyclohexyl, cycloheptyl, cyclooctyl, cyclononyl, cyclodecyl, cycloundecyl or cyclododecyl; preferably cyclopentyl, cyclohexyl or cycloheptyl, $X^5$ is an oxygen atom, a sulfur atom, an NH group, an N—($C_1$-$C_4$-alkyl) group, a carbonyl group, $A^2$ is a single bond or a spacer. Examples of spacers $A^2$ are para-phenylene, meta-phenylene, preferably $C_1$-$C_{20}$-alkylene, branched or unbranched, with from one to 6 nonadjacent $CH_2$ groups optionally being able to be replaced in each case by a sulfur atom, including oxidized, or oxygen atom. Mention may be made by way of example of the following spacers:

—$CH_2$—, —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$(CH_2)_{12}$—, —$(CH_2)_{14}$—, —$(CH_2)_{16}$—, —$(CH_2)_{18}$—, —$(CH_2)_{20}$—, —$CH_2$—$CH(CH_3)$—, —$CH_2$—$CH(C_2H_5)$—, —$CH_2$—$CH(CH[CH_3]_2)$—, —$CH_2$—$CH(n-C_3H_7)$—, —$[CH(CH_3)]_2$—, —$CH(CH_3)$—$CH_2$—$CH_2$—$CH(CH_3)$—, —$CH(CH_3)$—$CH_2$—$CH(CH_3)$—, —$CH_2$—$C(CH_3)_2$—$CH_2$—, —$CH_2$—$CH(n-C_4H_9)$—, —$CH_2$—$CH(iso-C_3H_7)$—, —$CH_2$—$CH(tert.-C_4H_9)$—, —$CH_2$—O—, —$CH_2$—O—$CH_2$—, —$(CH_2)_2$—O—$(CH_2)_2$—, —$[(CH_2)_2$—$O]_2$—$(CH_2)_2$—, —$[(CH_2)_2$—$O]_3$—$(CH_2)_2$—, —$CH_2$—S—, —$CH_2$—S—$CH_2$—, —$(CH_2)_2$—S—$(CH_2)_2$—, —$[(CH_2)_2$—$S]_2$—$(CH_2)_2$—, —$[(CH_2)_2$—$S]_3$—$(CH_2)_2$—, —$CH_2$—SO—$CH_2$—, —$CH_2$—$SO_2$—$CH_2$—, preferred spacers $A^2$ are $C_2$-$C_{10}$-alkylene groups, branched or unbranched, for example —$CH_2$—$CH_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—.

n is zero or one, $X^6$ is hydrogen, oxygen,

O—$C_1$-$C_{19}$-alkyl, preferably $C_1$-$C_6$-alkoxy groups such as methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy or ethoxy, $C_1$-$C_{12}$-alkyl, preferably methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, sec-hexyl, n-heptyl, n-octyl, 2-ethylhexyl, n-nonyl, n-decyl; particularly preferably $C_1$-$C_4$-alkyl such as methyl, ethyl, n-propyl, isopropyl, n-butyl, isobutyl, sec-butyl or tert-butyl, $C_2$-$C_{18}$-acyl, for example acetyl, propionyl, butyryl, benzoyl, stearyl, or aryloxycarbonyl having from 7 to 12 carbon atoms, for example $C_6H_5$—OCO.

Examples of particularly well-suited HALS are
4-amino-2,2,6,6-tetramethylpiperidine,
4-amino-1,2,2,6,6-pentamethylpiperidine,
4-hydroxy-2,2,6,6-tetramethylpiperidine,
4-hydroxy-1,2,2,6,6-pentamethylpiperidine,
4-amino-2,2,6,6-tetramethylpiperidine-N-oxyl,
4-hydroxy-2,2,6,6-tetramethylpiperidine-N-oxyl,
4-acetoxy-2,2,6,6-tetramethylpiperidine,
4-stearyloxy-2,2,6,6-tetramethylpiperidine,
4-aryloyloxy-2,2,6,6-tetramethylpiperidine,
4-methoxy-2,2,6,6-tetramethylpiperidine,
4-benzoyloxy-2,2,6,6-tetramethylpiperidine,
4-cyclohexyloxy-2,2,6,6-tetramethylpiperidine,
4-phenoxy-2,2,6,6-6-tetramethylpiperidine,
4-benzoxy-2,2,6,6-tetramethylpiperidine, and
4-(phenylcarbamoyloxy)-2,2,6,6-tetramethylpiperidine.

Likewise preferred HALS are:
bis(2,2,6,6-tetramethyl-4-piperidyl)oxalate,
bis-(2,2,6,6-tetramethyl-4-piperidyl)succinate,
bis(2,2,6,6-tetramethyl-4-piperidyl)malonate,
bis(2,2,6,6-tetramethyl-4-piperidyl)adipate,
bis(1,2,2,6,6-pentamethyl-piperidyl)sebacate,
bis(2,2,6,6-tetramethyl-4-piperidyl)terephthalate,
1,2-bis(2,2,6,6-tetramethyl-4-piperidyloxy)ethane,
bis(2,2,6,6-tetramethyl-4-piperidyl)hexamethylene-1,6-dicarbamate,
bis(1-methyl-2,2,6,6-tetramethyl-4-diperidyl)adipate, and
tris(2,2,6,6-tetramethyl-4-piperidyl)benzene-1,3,5-tricarboxylate.

Furthermore, preference is given to relatively high molecular weight piperidine derivates, e.g. the polymer of dimethyl butanedioate and 4-hydroxy-2,2,6,6-tetramethyl-1-piperidinethanol or poly-6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-14-piperidinyl)imino, and polycondensates of dimethyl succinate and 1-(2-hydroxyethyl)-4-hydroxy-2,2,6,6-tetramethylpiperidine, which, like bis(2,2,6,6-tetramethyl-4-piperidyl)sebacate, are particularly well-suited.

Very particularly suitable are 4-amino-2,2,6,6-tetramethylpiperidine, 4-amino-1,2,2,6,6-pentamethylpiperidine, 4-hydroxy-2,2,6,6-tetramethylpiperidine, 4-hydroxy-1,2,2,6,6-pentamethylpiperidine, 4-amino-2,2,6,6-tetramethylpiperidine-N-oxyl and 4-hydroxy-2,2,6,6-tetramethylpiperidine-N-oxyl.

In an embodiment of the present invention, the nitrogen-comprising heterocycle is a group of the formula III

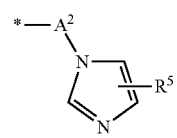

III where the variables are defined as follows:
$R^5$ is hydrogen or linear $C_1$-$C_4$-alkyl, such as methyl, ethyl, n-propyl, n-butyl, or $C_6$-$C_{14}$-aryl such as phenyl, 1-naphthyl or 2-naphthyl, or two radicals together form a fused-on, preferably aromatic system,
$A^2$ is a single bond or a spacer, where a spacer $A^2$ is as defined above.

Preferred examples are

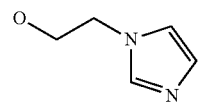

III.1

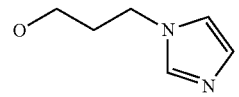

III.2

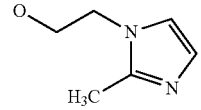

III.3

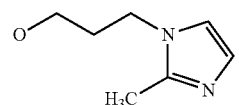

III.4

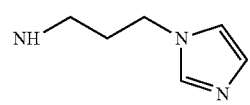

III.5

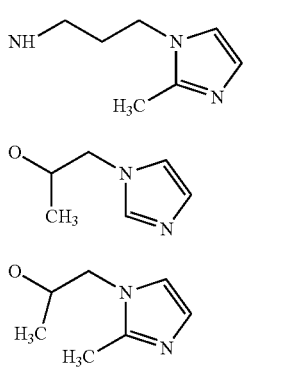

In an embodiment of the present invention, hyperbranched polycarbonates according to the invention have a dynamic viscosity in the range from 100 to 150 000 mPa·s, preferably up to 100 000 mPa·s, determined at 23° C., for example in accordance with DIN 53019.

In an embodiment of the present invention, hyperbranched polycarbonates according to the invention have a number average molecular weight ($M_n$) of from 100 to 15 000 g/mol, preferably from 200 to 12 000 g/mol and in particular from 300 to 10 000 g/mol, which can be determined, for example, by means of GPC, polymethyl methacrylate (PMMA) as standard and dimethylacetamide as eluent.

In an embodiment of the present invention, hyperbranched polycarbonates according to the invention have a glass transition temperature $T_g$ in the range from −70 to 10° C., determined by differential scanning calorimetry.

In an embodiment of the present invention, hyperbranched polycarbonates according to the invention have an OH number in the range from 0 to 600 mg KOH/g, preferably from 1 to 550 mg KOH/g and in particular from 1 to 500 mg KOH/g (in accordance with DIN 53240, part 2).

In an embodiment of the present invention, a hyperbranched polycarbonate according to the invention is prepared using one or more compounds having two alcoholic hydroxyl groups per molecule (d), also referred to as compounds (d) for short. Examples of suitable compounds (d) comprise ethylene glycol, diethylene glycol, triethylene glycol, 1,2- and 1,3-propanediol, dipropylene glycol, tripropylene glycol, neopentyl glycol, 1,2-, 1,3- and 1,4-butanediol, 1,2-, 1,3- and 1,5-pentanediol, hexanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)-propane, 1,1'-bis(4-hydroxyphenyl)-3,3-5-trimethylcyclohexane, resorcinol, hydro-quinone, 4,4'-dihydroxyphenyl, bis-(4-(hydroxyphenyl)sulfide, bis(4-hydroxyphenyl)sulfone, bis(hydroxymethyl)benzene, bis(hydroxymethyl)toluene, bis(p-hydroxyphenyl)-methane, bis(p-hydroxyphenyl)ethane, 2,2-bis(p-hydroxyphenyl)propane, 1,1-bis(p-hydroxyphenyl)cyclohexane, dihydroxybenzophenone, bifunctional polyether polyols based on ethylene oxide, propylene oxide, butylene oxide or mixtures thereof, polytetrahydrofuran, polycaprolactone or polyesterols based on diols and dicarboxylic acids.

In a further embodiment, hyperbranched polycarbonates according to the invention can comprise not only the functional groups obtained by means of the reaction (hydroxyl groups, carbonate groups of, for example, the formula O—CO—OR$^1$, carbamoyl chloride groups) but also one or more further functional groups. The functionalization can be effected during the build-up of the molecular weight or subsequently, i.e. after the actual polycondensation is complete.

If components which have not only hydroxyl or carbonate groups but also further functional groups or functional elements are added before or during the actual polycondensation, a hyperbranched polycarbonate polymer having randomly distributed functionalities different from the carbonate, carbamoyl chloride or hydroxyl groups are obtained.

Such effects can be achieved, for example, by addition of compounds bearing not only hydroxyl groups, carbonate groups or carbamoyl chloride groups but also further functional groups or functional elements such as mercapto groups, primary, secondary or tertiary amino groups, ether groups, carboxylic acid groups or derivatives thereof, sulfonic acid groups or derivatives thereof, phosphonic acid groups or derivatives thereof, silane groups, siloxane groups, aryl radicals or long-chain alcohol radicals during the polycondensation. To achieve modification by means of carbamate groups, it is possible to use, for example, ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

For modification by means of mercapto groups, it is possible to use, for example, mercaptoethanol. Tertiary amino groups can be produced by, for example, incorporation of triethanolamine, tripropanolamine, N-methyldiethanolamine, N-methyl-dipropanolamine or N,N-dimethylethanolamine. Ether groups can, for example, be generated by cocondensation of bifunctional or higher-functional polyetherols. Addition of dicarboxylic acids, tricarboxylic acids, dicarboxylic esters, for example dimethyl terephthalate, or tricarboxylic esters enables ester groups to be produced. Reaction with long-chain alkanols or alkanediols enables long-chain alkyl radicals to be introduced. Reaction with alkyl or aryl diisocyanates generates polycarbonates which have alkyl, aryl and urethane groups, and the addition of primary or secondary amines leads to introduction of urethane or urea groups.

Subsequent functionalization can be obtained by reacting the hyperbranched polycarbonate according to the invention with a suitable functionalization reagent which can react with the OH and/or carbonate or carbamoyl chloride groups of the polycarbonate in an additional process step.

Hydroxyl-comprising hyperbranched polycarbonates according to the invention can, for example, be modified by addition of molecules comprising acid groups or isocyanate groups. For example, polycarbonates comprising acid groups can be obtained by reaction with compounds comprising anhydride groups. Furthermore, hydroxyl-comprising hyperbranched polycarbonates according to the invention can also be converted into high-functionality polycarbonate-polyether polyols by reaction with alkylene oxides, for example ethylene oxide, propylene oxide or butylene oxide.

The present invention further provides a process for preparing hyperbranched polycarbonates according to the invention, hereinafter also referred to as preparative process of the invention. To carry out the preparative process of the invention, (a) at least one compound having at least three alcoholic hydroxyl groups per molecule and
(b) at least one reagent of the general formula I, (c) at least one reagent of the general formula $X^3-(A^1)_m-X^4$
(d) and, if appropriate, at least one compound having two alcoholic hydroxyl groups per molecule are preferably mixed with one another and heated to a temperature in the range from 60 to 260° C., preferably from 80 to 220° C.

The reaction of compound (a) with reagent (b) and reagent (c) can be carried out in one step. However, it can also be carried out in two steps, so that, for example, compound (a) can firstly be reacted with reagent (b) to produce a hyperbranched polycarbonate and this can then be functionalized with reagent (c).

In the reaction with reagent (b), $H—X^1$ and $H—X^2$ are usually eliminated. When $H—X^1$ and/or $H—X^2$ are/is hydrogen halide, in particular HCl, the hydrogen halide(s) which is eliminated is preferably removed from the reaction mixture by addition of a base, for example in equimolar amounts, based on hydrogen halide to be eliminated. Suitable bases are, for example, alkali metal hydroxides or organic amines, in particular tertiary amines such as triethylamine and Hünig base (diisopropylethylamine). When $H—X^1$ and $H—X^2$ are alcohols, the alcohol(s) $H—X^1$ and $H—X^2$ eliminated are preferably distilled off, preferably during the reaction. The removal by distillation can be carried out at atmospheric pressure or under reduced pressure, for example from 0.1 to 950 mbar, in particular from 100 to 900 mbar. The distillation is preferably carried out at atmospheric pressure.

In an embodiment of the present invention, the preparative process of the invention is carried out in the presence of an organic solvent which is preferably aprotic. Examples are decane, dodecane, or solvent naphtha, also aromatic hydrocarbons such as toluene, ethylbenzene, one or more isomeric xylenes or chlorinated aromatic hydrocarbons such as chlorobenzene. Also suitable are ethers having a sufficiently high boiling point, for example di-n-butyl ether or 1,4-dioxane. Further suitable solvents are N,N-dimethylformamide and N,N-dimethylacetamide. However, the preparative process of the invention is preferably carried out without the use of solvents.

In an embodiment of the present invention, the preparative process of the invention is carried out in the presence of a catalyst or a catalyst mixture. Suitable catalysts are compounds which catalyze esterification or transesterification reactions, for example alkali metal hydroxides, alkali metal carbonates, alkali metal hydrogencarbonates, preferably of sodium, potassium or cesium, or organic amines, in particular tertiary amines, guanidines, ammonium compounds, phosphonium compounds, organic compounds of aluminum, tin, zinc, titanium, zirconium or bismuth, also double metal cyanide (DMC) catalysts as described, for example, in DE 10138216 or DE 10147712.

Preference is given to using potassium hydroxide, potassium carbonate, potassium hydrogencarbonate, sodium hydroxide, sodium carbonate, sodium hydrogencarbonate, 1,4-diazabicyclo[2.2.2]octane (DABCO), diazabicyclononene (DBN), diazabicyclo-undecene (DBU), imidazoles such as imidazole, 1-methylimidazole or 1,2-dimethyl-imidazole, titanium tetra-n-butylate, titanium tetraisopropylate, dibutyltin oxide, dibutyltin dilaurate, tin dioctoate, zirconium acetylacetonate or mixtures thereof.

The catalyst or catalyst mixture is generally added in an amount of from 50 to 10 000 ppm by weight, preferably from 100 to 5000 ppm by weight, based on the amount of compound (a) used or the sum of (a) and (d).

In an embodiment of the present invention, the hyperbranched polycarbonates of the invention are prepared in a pressure range from 0.1 mbar to 20 bar, preferably from 1 mbar to 5 bar.

In an embodiment of the present invention, the preparative process of the invention is carried out in reactors or reactor cascades which can be operated batchwise, semicontinuously or continuously, for example in one or more vessels.

In an embodiment of the present invention, a hyperbranched polycarbonate according to the invention is prepared using:

from 10 to 59 mol % of compound (a), preferably from 10 to 55 mol % and particularly preferably up to 49 mol % of compound (a),
from 40 to 60 mol % of reagent (b), preferably from 45 to 55 mol % and particularly preferably 50 mol % of reagent (b),
from 1 to 50 mol % of reagent (c), preferably up to 45 mol % and particularly preferably up to 40 mol % of reagent (c),
in each case based on the total reaction mixture.

The amount of the compound or compounds (d) used is normally from 0 to 50 mol % based on the compound (a), preferably from 0 to 45 mol %, particularly preferably up to 40 mol % and very particularly preferably from 0 to 30 mol %.

The abovementioned setting of the reaction conditions and, if appropriate, the choice of the suitable solvent enables the hyperbranched polycarbonates of the invention obtained as crude product to be processed further after they have been prepared without further purification.

In a further preferred embodiment, the hyperbranched polycarbonate according to the invention obtained as crude product is stripped, i.e. freed of low molecular weight, volatile compounds. For this purpose, the catalyst can optionally be deactivated after the desired conversion has been reached and the low molecular weight volatile constituents, e.g. monoalcohols, phenols, carbonates, hydrogen chloride or volatile oligomeric or cyclic compounds can be removed by distillation, if appropriate with introduction of a gas, preferably nitrogen, carbon dioxide or air, if appropriate under reduced pressure.

There are various possible ways of stopping the intermolecular polycondensation reaction of the preparative process of the invention. For example, the temperature can be reduced to a range in which the reaction ceases and the hyperbranched polycarbonate according to the invention is storage-stable. In another embodiment, the catalyst or catalyst mixture can be deactivated, in the case of basic catalysts by, for example, addition of an acidic component, for example a Lewis acid or an organic or inorganic protic acid.

Furthermore, the polycondensation can be stopped automatically when a sufficient number of terminal functional groups is no longer available for a further reaction due to reaction with reagent (c).

In a further embodiment, the reaction can be stopped as soon as a hyperbranched polycarbonate according to the invention having the desired degree of polycondensation is present by addition of a product having groups which are reactive toward the hyperbranched polycarbonate according to the invention. Thus, for example, it is possible to add a monoamine, diamine or polyamine or, for example, a monoisocyanate, diisocyanate or polyisocyanate, a compound comprising epoxide groups or an acid derivative which is reactive toward OH groups.

The hyperbranched polycarbonates obtained by the process of the invention can be used, for example, as bonding agents, thixotropes or as building blocks for preparing polyaddition or polycondensation polymers, for example as components for producing surface coating systems, coatings, encapsulations, adhesives, sealants, casting elastomers or foams.

The invention further provides for the use of the hyperbranched polycarbonates of the invention as bonding agents, thixotropes or as building blocks for preparing polyaddition or polycondensation polymers, for example of surface coating systems, coatings, encapsulations, adhesives, sealants, casting elastomers or foams.

The invention provides in particular for the use of hyperbranched polycarbonates according to the invention for producing thermoplastic materials, printing inks such as flexographic, gravure, offset or screen printing inks. In particular, the hyperbranched polycarbonates of the invention are used for producing coatings and surface coating systems, but in particular also as binders, if appropriate in a mixture with other binders.

For this purpose, hyperbranched polycarbonates according to the invention can be formulated with suitable solvents, colorants, optionally further binders and also additives typical of printing inks, paints and varnishes or coatings. For further details on the formulation and production of printing inks using hyperbranched polymers, WO 02/36695, and WO 02/26697 are expressly incorporated by reference, in particular the details in WO 02/36695, page 10, line 19 to page 15, line 14 and in WO 02/36697, page 7, line 14 to page 10, line 18, and also the examples presented in the documents mentioned.

Printing inks, paints and varnishes and coatings comprising the polycarbonates of the invention display particularly good adhesion to the substrates, in particular to wood, metals and/or polymers.

Printing inks according to the invention are therefore very particularly useful for producing laminates comprising two or more polymer films and/or metal foils, in which one film/foil is printed with one or more layers of a printing ink and is laminated onto the printed side of a second film/foil. Such composites are used, for example, for the production of packaging.

Hyperbranched polycarbonates according to the invention are further useful for producing foams, in particular polyurethane foams.

Hyperbranched polycarbonates according to the invention are very particularly useful for preparing and stabilizing thermoplastics or thermosets, especially for thermoplastic polyurethanes, polyamides, polyesters, polycarbonates, polystyrene and styrene copolymers, polyethylene and polypropylenes, but in particular also as termination agent and very particularly for preparing polyoxymethylene ("POM"). The present invention further provides for the use of hyperbranched polycarbonates according to the invention as stabilizers for polyurethanes, polyamides, polyesters, polycarbonates, polystyrene and styrene copolymers, polyethylenes and polypropylenes and also as termination agent for the preparation of polyoxymethylene. The present invention further provides a process for preparing thermoplastics or thermosets and in particular polyoxymethylene using hyperbranched polycarbonates according to the invention, for example as termination agent.

Polyoxymethylene homopolymers or copolymers (POMs) are known per se and commercially available. The polyoxymethylene homopolymers are prepared by polymerization of formaldehyde or trioxane; in addition, one or more comonomers are concomitantly used in the preparation of polyoxymethylene polymers. The comonomers are preferably selected from among formaldehyde, trioxane and other cyclic or linear formals (acetals or formaldehyde) or other formaldehyde sources. Hereinafter, polyoxymethylene homopolymers and polyoxymethylene copolymers will be referred to collectively as POMs.

POM quite generally has at least 50 mol % of recurring —$CH_2O$— units in the main polymer chain. Polyoxymethylene copolymers are preferred, especially ones which comprise not only the recurring —$CH_2O$— units but also up to 50 mol %, preferably from 0.01 to 20 mol %, in particular from 0.1 to 10 mol % and very particularly preferably from 0.5 to 6 mol %, of recurring

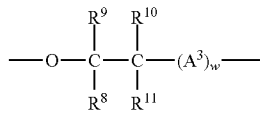

units, where $R^8$ to $R^{11}$ are each, independently of one another, hydrogen, $C_1$-$C_4$-alkyl or halogen-substituted alkyl having 1 to 4 carbon atoms and $A^3$ is a —$CH_2$— group, —$CH_2O$— group, a $C_1$-$C_4$-alkyl- or $C_1$-$C_4$-haloalkyl-substituted methylene group or a corresponding oxymethylene group and w is in the range from 0 to 3. These groups can advantageously be introduced into polyoxymethylene copolymers by ring opening of cyclic ethers. Preferred cyclic ethers are those of the formula

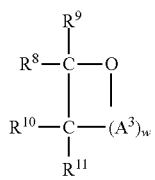

Mention may be made by way of example of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) as cyclic ethers and linear oligoformals or polyformals such as polydioxolane or polydioxepane as comonomers.

Also suitable are oxymethylene terpolymers which are prepared, for example, by reaction of trioxane and one of the above-described cyclic ethers with a third monomer, for example bifunctional compounds of the formula

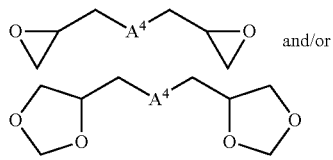

where $A^4$ is a single bond, —O—, —$OA^5O$— ($A^5$ is $C_1$-$C_8$-alkylene or $C_3$-$C_8$-cycloalkylene).

Preferred comonomers of the abovementioned type are ethylene diglycide, diglycidyl ethers and diethers derived from glycidyls and formaldehyde, dioxane or trioxane in a molar ratio of 2:1 and also diethers derived from 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to name only a few examples.

End-group-stabilized POMs which have predominantly C—C— or —O—CH₃ bonds at the ends of the chain are particularly preferred.

Preferred embodiments of POM have melting points of at least 150° and molecular weights (weight average) $M_w$ in the range from 5000 to 300 000 g/mol, preferably from 7000 to 250 000 g/mol. Particular preference is given to embodiments of POM having a polydispersity ($M_w/M_n$) of from 2 to 15, preferably from 2.5 to 12, particularly preferably from 3 to 9. The measurements are generally carried out by gel permeation chromatography (GPC)/SEC (size exclusion chromatography), and the $M_n$ (number average molecular weight) is generally determined by means of GPC/SEC.

The molecular weight of POM can, if appropriate, be set to the desired values by means of the regulators customary in trioxane polymerization and also by means of the reaction temperature and residence time. Possible regulators are acetal or formals of monohydric alcohols, the corresponding alcohols themselves and also the small amounts of water which function as chain transfer agents and whose presence can generally never be completely avoided. Regulators are used in amounts of from 10 to 10 000 ppm, preferably from 20 to 5000 ppm, based on trioxane used.

In the case of formaldehyde as monomer, the polymerization can be initiated anionically or cationically, and in the case of trioxane as monomer it can be initiated cationiccally. The polymerization is preferably initiated cationically.

As initiators (also referred to as catalysts), it is possible to use the cationic initiators customary in trioxane polymerization. Suitable initiators are protic acids such as fluorinated or chlorinated alkylsulfonic and arylsulfonic acids, e.g. perchloric acid, trifluoromethanesulfonic acid, or Lewis acids such as tin tetrachloride, arsenic pentafluoride, phosphorus pentafluoride and boron trifluoride and also their complexes and salt-like compounds, e.g. boron trifluoride etherate and triphenylmethylene hexafluorophosphate. Initiators are used in amounts of from about 0.01 to 1000 ppm, preferably from 0.01 to 500 ppm and in particular from 0.01 to 200 ppm, based on trioxane used. It is generally advisable to add initiator in diluted form, preferably in concentrations of from 0.005 to 5% by weight. As diluents for this purpose, it is possible to use inert compounds such as aliphatic or cycloaliphatic hydrocarbons, e.g. cyclohexane, halogenated aliphatic hydrocarbons, glycol ether, cyclic carbonates, lactones, etc. Particularly preferred solvents are triglyme (triethylene glycol dimethyl ether), 1,4-dioxane, 1,3-dioxolane, propylene carbonate and γ-butyrolactone.

In addition to initiators, it is possible to use cocatalysts. Examples of cocatalysts are alcohols of any type, for example aliphatic alcohols having from 2 to 20 carbon atoms, e.g. tert-amyl alcohol, methanol, ethanol, n-propanol, n-butanol, n-pentanol, n-hexanol, aromatic alcohols having from 6 to 30 carbon atoms, for example hydroquinone, halogenated alcohols having from 2 to 20 carbon atoms, e.g. hexafluoroisopropanol; very particular preference is given to glycols of any type, in particular diethylene glycol and triethylene glycol; and aliphatic dihydroxy compounds, in particular diols having from 2 to 6 carbon atoms, e.g. 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol.

Monomers, initiators, cocatalysts and if appropriate regulators can be premixed in any way before introduction into the polymerization reactor or can be introduced separately from one another.

Furthermore, the components can comprise stabilizer, for example sterically hindered phenols as described in EP-A 0 129 369 or EP-A 0 128 739.

The polymerization mixture is preferably deactivated immediately after the polymerization, preferably without a phase change occurring. The deactivation of initiator residues (catalyst residues) is effected by addition of one or more deactivators (termination agents) to the polymerization melt. According to the invention, one or more hyperbranched polycarbonates according to the invention are used as termination agent.

POMs derived from formaldehyde can usually be prepared in a manner known per se by polymerization in the gas phase, in solution, by precipitation polymerization or in bulk. POMs derived from trioxane are generally obtained by polymerization in bulk, for which purpose any reactors having a good mixing action can be used. The reaction can be carried out homogeneously, e.g. in a melt, or heterogeneously, e.g. as polymerization to form a solid or granulated solid. Suitable reactors are, for example, dish reactors, ploughshare mixers, tube reactors, List reactors, kneaders (e.g. Buss kneaders), extruders having, for example, one or two screws and stirred reactors, with these reactors being able to have static or dynamic mixers.

In the case of a polymerization in bulk, e.g. in an extruder, a melt seal to the extruder intake can be produced by means of molten POM, as a result of which volatile constituents remain in the extruder. The above monomers are introduced into the polymer melt present in the extruder either together with or separately from the initiators (catalysts), at a preferred temperature of the reaction mixture of from 62 to 114° C. The monomers (trioxane) are preferably also introduced in the molten state, e.g. at from 60 to 120° C.

The melt polymerization is generally carried out at from 1.5 to 500 bar and from 130 to 300° C., and the residence time of the polymerization mixture in the reactor is usually from 0.1 to 20 minutes, preferably from 0.4 to 5 minutes. The polymerization is preferably carried out to a conversion of above 30%, e.g. from 60 to 90%.

In any case, a crude POM which, as mentioned, comprises considerable proportions, for example up to 40% by weight, of unreacted residual monomers, in particular trioxane and formaldehyde, is obtained. Formaldehyde can also be present in the crude POM even when only trioxane has been used as monomer since it can be formed as degradation product of trioxane. In addition, other oligomers of formaldehyde, e.g. the tetrameric tetroxane, can also be present.

Preference is given to using trioxane as monomer for preparing the POM, which is why the residual monomers also comprise trioxane and in addition usually from 0.5 to 10% by weight of tetroxane and from 0.1 to 75% by weight of formaldehyde.

The crude POM is usually degassed in a degassing apparatus. Suitable degassing apparatuses are degassing pots (flash pots), vented extruders having one or more screws, filmtruders, thin film evaporators, spray driers, stream degassers and other customary degassing apparatuses. Preference is given to using vented extruders or degassing pots. The latter are particularly preferred.

Degassing can be carried out in one stage (in a single degassing apparatus). It can likewise be carried out in a plurality of stages, for example two stages, in a plurality of degassing apparatuses which may be identical or different in terms of type and size. Preference is given to using two different degassing pots connected in series, with the second pot being able to have a smaller volume.

In single-stage degassing, the pressure in the degassing apparatus is usually from 0.1 mbar to 10 bar, preferably from 5 mbar to 800 mbar, and the temperature is generally from 100 to 260° C., in particular from 150 to 210° C. In the case of two-stage degassing, the pressure in the first stage is preferably from 0.1 mbar to 10 bar, preferably from 1 mbar to 7 bar, and that in the second stage is preferably from 0.1 mbar to 5 bar, preferably from 1 mbar to 1.5 bar. The temperature in a two-stage degassing is generally not significantly different from the temperatures mentioned for the single-stage degassing.

The temperature of the POM during degassing can be regulated in a manner known per se by means of heat exchangers, a double wall, temperature-controlled static mixers, internal heat exchangers or other suitable devices. The degassing pressure is likewise set in a manner known per se, e.g. by means of pressure-regulating valves. The POM can be in molten or solid form in the degassing apparatus.

The residence time of the polymer in the degassing apparatus is generally from 0.1 second to 30 minutes, preferably from 0.1 second to 20 minutes. In the case of multistage degassing, these times in each case relate to a single stage.

The degassed POM is generally taken off from the degassing apparatus by means of pumps, extruders or other customary transport devices.

The residual monomers liberated during degassing are separated off as a vapor stream. Regardless of the configuration of the degassing (single-stage or multistage, degassing pots or vented extruders, etc.), the residual monomers are usually selected from among trioxane, formaldehyde, tetroxane, 1,3-dioxolane, 1,3-dioxepane, ethylene oxide and oligomers of formaldehyde.

The residual monomers separated off (vapor stream) are taken off in a customary way. They can be condensed and are preferably recirculated to the polymerization. The ratio of trioxane to formaldehyde in the vapor stream can be varied by setting appropriate pressures and temperatures.

The degassed polymer, i.e. the polyoxymethylene homopolymers and copolymers obtainable by the process of the invention, can be provided with customary additives. Such additives are, for example,
talc,
polyamides, in particular copolyamides,
alkaline earth metal silicates and alkaline earth metal glycerophosphates,
esters or amides of saturated aliphatic carboxylic acids,
ethers derived from alcohols and ethylene oxide,
nonpolar polypropylene waxes,
nucleating agents,
fillers,
impact-modified polymers, in particular those based on ethylene-propylene (EPM) or ethylene-propylene-diene (EPDM) rubbers,
flame retardants,
plasticizers,
bonding agents,
dyes and pigments,
formaldehyde scavengers, in particular amine-substituted triazine compounds, zeolites or polyethylenimines
antioxidants, in particular those having a phenolic structure, benzophenone derivates, benzotriazole derivates, acrylates, benzoates, oxanilides and sterically hindered amines (HALS=hindered amine light stabilizers).

The abovementioned additives are known per se as additive to POM and are described, for example, in Gächter/Müller, Plastics Additives Handbook, Hanser Verlag Munich, 4th edition, 1993, Reprint 1996.

The amount of additives depends on the additive used and the desired effect. The usual amounts are known to those skilled in the art. The additives are, if they are used, added in a customary way, for example individually or together, as such, as a solution or suspension or preferably as a masterbatch.

The finished POM molding composition can be produced in a single step by, for example, mixing the POM and the additives in an extruder, kneader, mixer or another suitable mixing apparatus with melting of the POM, discharging the mixture and subsequently pelletizing it.

However, it has been found to be advantageous firstly to premix some or all of the components "cold" in a dry mixer or another mixing apparatus and homogenizing the resulting mixture in a second step with melting of the POM, if appropriate with addition of further components, in an extruder or other mixing apparatus. In particular, it can be advantageous to premix at least the POM and the antioxidant (if used).

The mixing apparatus, e.g. the extruder, can be provided with degassing facilities, for example to remove residual monomers or other volatile constituents in a simple manner. The homogenized mixture is discharged and preferably pelletized in the usual way.

To minimize the residence time of the degassed POM between degassing apparatus and mixing apparatus, it is possible to install at least one, in particular the only or the last, degassing apparatus directly on a mixing apparatus. The output from the degassing apparatus particularly preferably coincides with the input into the mixing apparatus. For example, it is possible to use a degassing pot which has no bottom and is melted directly on the inlet dome of an extruder. Here, the extruder represents the bottom of the degassing pot and is at the same time its discharge facility.

The use of hyperbranched polycarbonates according to the invention enables polyoxymethylene to be prepared in a simple way, particularly when the residual monomers are to be completed or partly recirculated. In particular, residual monomers which have been separated off can be recirculated without purification directly to the polymerization without adverse effects on the polymerization.

The present invention is illustrated by the following examples.

EXAMPLES

General Preliminary Remarks

The alcohol distilled off was collected in a cooled round-bottom flask, weighed and the conversion was in this way determined as a percentage of the conversion which is theoretically possible.

The reaction products were analyzed by gel permeation chromatography using N,N-dimethylacetamide as eluent and polymethyl methacrylate (PMMA) as standard.

The viscosity is in each case the dynamic viscosity determined at 23° C. in accordance with DIN 53019.

I. Preparation of Hyperbranched Polycarbonates According to the Invention

I.1 Preparation of Hyperbranched Polycarbonate PC.1 According to the Invention 216 g of the triol (a.1) (1,1,1-trimethylolpropane etherified with 1 mol of ethylene oxide per mol of hydroxyl groups), 34.3 g of 1,2,2,6,6-pentamethylpiperidin-4-ol (c.1) and 118.1 g of diethyl carbonate (b.1) were placed in a three-neck flask provided with stirrer, reflux condenser and internal thermometer, 0.1 g of potassium carbonate was then added, the mixture was heated to 140° C. while stirring and stirred at 140° C. for 2.5 hours. As the reaction time increased, the temperature of the reaction mixture decreased slowly to about 115° C. as a result of evaporative cooling caused by the ethanol liberated.

The reflux condenser was then replaced by a descending condenser, ethanol was distilled off and the temperature of the reaction mixture was slowly increased to 200° C. The ethanol distilled off (75 g=80 mol % based on quantitative conversion) was collected in a cooled round-bottom flask. The reaction mixture was subsequently cooled to room temperature and analyzed by gel permeation chromatography. The number average molecular weight $M_n$ of hyperbranched polycarbonate PC.1 according to the invention was 1100 g/mol and the weight average molecular weight $M_w$ was 2500 g/mol. Viscosity: 1200 mPa·s.

I.2 Preparation of Hyperbranched Polycarbonate PC.2 According to the Invention 162 g of the triol (a.1), 68.5 g of 1,2,2,6,6-pentamethylpiperidin-4-ol (c.1) and 118.1 g of diethyl carbonate (b.1) were placed in a three-neck flask provided with stirrer, reflux condenser and internal thermometer, 0.1 g of potassium carbonate was then added, the mixture was heated to 140° C. while stirring and stirred at this temperature for 3.5 hours. As the reaction time increased, the temperature of the reaction mixture decreased slowly to about 115° C. as a result of evaporative cooling caused by the ethanol liberated. The reflux condenser was then replaced by a descending condenser, ethanol was distilled off and the temperature of the reaction mixture was slowly increased to 200° C. The ethanol distilled off (72 g=78 mol % based on quantitative conversion) was collected in a cooled round-bottom flask. The reaction mixture was subsequently cooled to room temperature and analyzed by gel permeation chromatography. The number average molecular weight $M_n$ of hyperbranched polycarbonate PC.2 according to the invention was 400 g/mol and the weight average molecular weight $M_w$ was 1100 g/mol. Viscosity: 1050 mPa·s.

I.3 Preparation of Hyperbranched Polycarbonate PC.3 According to the Invention 216 g of the triol (a.1), 31.5 g of 2,2,6,6-tetramethylpiperidin-4-ol (c.2) and 118.1 g of diethyl carbonate (b.1) were placed in a three-neck flask provided with stirrer, reflux condenser and internal thermometer, 0.1 g of potassium carbonate was then added, the mixture was heated to 140° C. while stirring and stirred at this temperature for 3.5 hours. As the reaction time increased, the temperature of the reaction mixture decreased slowly to about 115° C. as a result of evaporative cooling caused by the ethanol liberated. The reflux condenser was then replaced by a descending condenser, ethanol was distilled off and the temperature of the reaction mixture was slowly increased to 200° C. The ethanol distilled off (82 g=89 mol % based on quantitative conversion) was collected in a cooled round-bottom flask. The reaction mixture was subsequently cooled to room temperature and analyzed by gel permeation chromatography. The number average molecular weight $M_n$ of hyperbranched polycarbonate PC.3 according to the invention was 1500 g/mol and the weight average molecular weight $M_w$ was 3200 g/mol. Viscosity: 3200 mPa·s.

I.4 Preparation of Hyperbranched Polycarbonate PC.4 According to the Invention 162 g of the triol (a.1), 50.1 g of 1-(3-aminopropyl)imidazole (c.3)

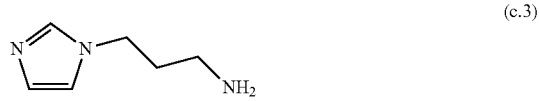

(c.3)

and 118.1 g of diethyl carbonate (b.1) were placed in a three-neck flask provided with stirrer, reflux condenser and internal thermometer, 0.1 g of potassium carbonate was then added, the mixture was heated to 140° C. while stirring and stirred at this temperature for 3.5 hours. As the reaction time increased, the temperature of the reaction mixture decreased slowly to about 115° C. as a result of evaporative cooling caused by the ethanol liberated. The reflux condenser was then replaced by a descending condenser, ethanol was distilled off and the temperature of the reaction mixture was slowly increased to 200° C. The ethanol distilled off (75 g=80 mol % based on quantitative conversion) was collected in a cooled round-bottom flask. The reaction mixture was subsequently cooled to room temperature and analyzed by gel permeation chromatography. The number average molecular weight $M_n$ of hyperbranched polycarbonate PC.4 according to the invention was 950 g/mol and the weight average molecular weight $M_w$ was 1900 g/mol. Viscosity: 12 100 mPa·s.

1.5 Preparation of Hyperbranched Polycarbonate PC.5 According to the Invention 108 g of the triol (a.1), 17.2 g of 4-hydroxy-2,2,6,6-tetramethylpiperidin-1-oxyl (TEMPOL) (c.4) and 59.1 g of diethyl carbonate (b.1) were placed in a three-neck flask provided with stirrer, reflux condenser and internal thermometer, 0.1 g of potassium hydroxide was then added, the mixture was heated to 140° C. while stirring and stirred at this temperature for 3.5 hours. As the reaction time increased, the temperature of the reaction mixture decreased slowly to about 115° C. as a result of evaporative cooling caused by the ethanol liberated. The reflux condenser was then replaced by a descending condenser, ethanol was distilled off and the temperature of the reaction mixture was slowly increased to 200° C. The ethanol distilled off (38 g=82 mol % based on quantitative conversion) was collected in a cooled round-bottom flask. The reaction mixture was subsequently cooled to room temperature and PC.5 was analyzed by gel permeation chromatography. The number average molecular weight $M_n$ was 2100 g/mol and the weight average molecular weight $M_w$ was 5700 g/mol. The viscosity was 15 400 mPas at 23° C.

1.6 Preparation of Hyperbranched Polycarbonate PC.6 According to the Invention 270 g of the triol (a.1) and 118.3 g of diethyl carbonate (b.1) were placed in a three-neck flask provided with stirrer, reflux condenser and internal thermometer, 0.1 g of potassium carbonate was then added, the mixture was heated to 140° C. while stirring and stirred at this temperature for 3.5 hours. As the reaction time increased, the temperature of the reaction mixture decreased slowly to about 115° C. as a result of evaporative cooling caused by the ethanol liberated. The reflux condenser was then replaced by a descending condenser, ethanol was distilled off and the temperature of the reaction mixture was slowly increased to 200° C. The ethanol distilled off (64 g=70 mol % based on quantitative conversion) was collected in a cooled round-bottom flask. The product was then cooled to 140° C., 0.1 g of 85% strength phosphoric acid was added and monomer was removed at 140° C. and a pressure of 40 mbar for 10 minutes. The reaction mixture was subsequently cooled to room temperature and the hyperbranched polycarbonate obtainable in this way was analyzed by gel permeation chromatography. The number average molecular weight $M_n$ was 1300 g/mol and the weight average molecular weight $M_w$ was 2300 g/mol. The OH number of the polymer, determined in accordance with DIN 53240, part 2, was 300 mg KOH/g.

33.5 g of the hyperbranched polycarbonate obtained as described above was placed in a three-neck flask provided with stirrer, reflux condenser and internal thermometer, admixed with 34.8 g of 3-(3,5-di-tert-butyl-4-hydroxyphenyl)propionic acid (c.5) and 0.05 g of dibutyltin dilaurate and the mixture was heated to 180° C. while stirring and stirred for 8 hours, with small amounts of water being separated off via the descending condenser. PC.6 was subsequently cooled to room temperature and analyzed by gel permeation chromatography. The number average molecular weight $M_n$ was 1300 g/mol and the weight average molecular weight $M_w$ was 2200 g/mol. The OH number was 98 mg KOH/g, and the viscosity at 23° C. was 85 000 mPas.

II. Use Experiments: Polycarbonates According to the Invention as Terminating Agents for POM II.1 Preparation of Polyoxymethylene (POM)

General Method:

that the degassed polymer fell directly from the pot onto the extruder screws.

The extruder was operated at 190° C. and a screw speed of 150 rpm and was provided with vents which were operated at 250 mbar. In addition, it had a feed opening for additives through which 0.5 kg/h of the antioxidant Irganox® 245 was metered in. The product was discharged, cooled and pelletized in the usual way.

The melt volume rate (MVR) of the pellets obtained was determined in accordance with ISO 1133 at a melt temperature of 190° C. and a nominal load of 2.16 kg.

Antioxidant Irganox® 245 from Ciba: a compound of the formula

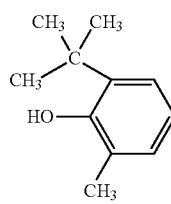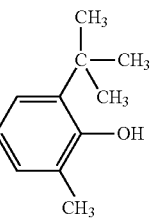

A monomer mixture comprising 95% by weight of trioxane, 3% by weight of dioxolane and 0.005% by weight of methylal was metered continuously at a volume flow of 5 kg/h into a polymerization reactor. The reactor was a tube reactor provided with static mixers and was operated at 150° C. at 30 bar.

As initiator, 0.1 ppm by weight of perchloric acid was mixed into the monomer stream; a 0.01% strength by weight solution of 70% strength by weight aqueous perchloric acid in γ-butyrolactone was used for this purpose. After a polymerization time (residence time) of 2 minutes, hyperbranched polycarbonate according to the invention as shown in table 1 was metered as a 0.1% strength by weight solution in 1,3-dioxolane into the polymer melt and mixed in so that hyperbranched polycarbonate according to the invention was present in a 10-fold molar excess of the piperidine end groups (PC.1 to PC.3) or imidazole end groups (PC.4) over the initiator. The residence time in the deactivation zone was 3 minutes.

The polymer melt was taken off via a pipe and depressurized through a regulating valve into a first degassing pot which was provided with an offgas line. The temperature of the degassing pot was 190° C. and the pressure was 3.5 bar.

The vapor was taken off from the first degassing pot via the offgas line and introduced into a falling film condenser and there brought into contact with a feed stream of fresh trioxane at 118° C. and 3.5 bar. Part of the vapor was precipitated here in the fresh trioxane; the mixture obtained was subsequently passed to the polymerization reactor. The vapor which had not been precipitated in the fresh trioxane was introduced through a pressure maintenance valve which regulated the pressure in the falling film condenser into an offgas line.

The polymer melt was taken off from the first degassing pot via a pipe and depressurized via a regulating valve into a second degassing pot which was provided with an offgas line. The temperature of the second degassing pot was 190° C. and the pressure was ambient pressure. The second degassing pot had no bottom and was mounted directly on the feed dome of a twin-screw extruder ZSK 30 from Werner & Pfleiderer so II.2 Comparative Experiments The comparative experiments were in each case carried out using the appropriate amount of comparative deactivator C-DA.1 to C-DA.4.

C-DA.1: 4-amino-2,2,6,6-tetramethylpiperidine,

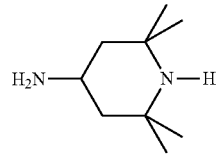

C-DA.2:

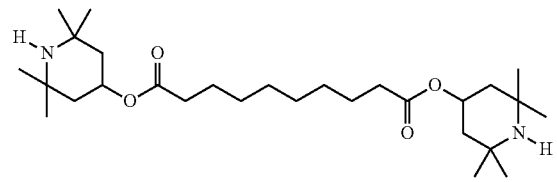

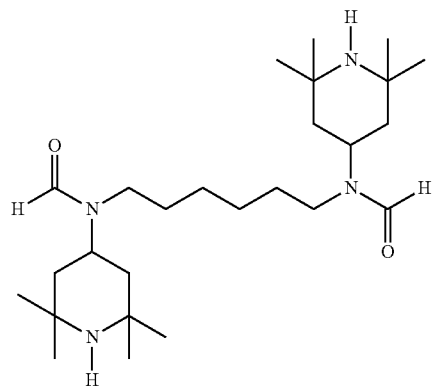

C-DA.4: 4-aminopyridine

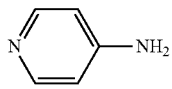

The procedure described under II.1 was repeated, but, instead of a hyperbranched polycarbonate according to the invention, one of the comparative deactivators C-DA.1 to C-DA.4 was introduced as a 0.1% strength by weight solution in 1,3-dioxolane into the polymer melt and mixed in so that the compound C was present in a 10-fold molar excess over the initiator.

As the vapor from the first degassing pot came into contact with the trioxane feed in the falling film condenser and this mixture was conveyed into the polymerization reactor, the reaction commenced. No pelletizable product could be obtained.

Table 1 summarizes the results.

TABLE 1

Results of the preparation of POM

| Example | Deactivator | Melt of volume rate MVR (190° C., 2.16 kg) [cm$^3$/10 min] |
|---|---|---|
| 1 | PC. 1 | 18.5 |
| 2 | PC. 2 | 17 |
| 3 | PC. 3 | 16 |
| 4 | PC. 4 | 7 |
| C-5 | C-DA. 1 | no product obtained |
| C-6 | C-DA. 2 | no product obtained |
| C-7 | C-DA. 3 | no product obtained |
| C-8 | C-DA. 4 | no product obtained |

III. Use Experiments: Polymers According to the Invention as Stabilizers in Surface Coating Systems III.1. Raw Materials for Producing Surface Coating Systems (According to the Invention and Comparative Surface Coating Systems)

The following surface coating components were used:

Polyacrylate polyol: polyacrylate polyol having an OH number of about 100 mg KOH/g and a viscosity of 700-1000 mPas, 60% strength by weight solution in xylene/n-butyl acetate, commercially available as Macrynal® SM 600, from Cytec.

Polyisocyanate: trimeric hexamethylene diisocyanate, 100% strength; NCO content: 22%; viscosity: about 3000 mPa·s.

MPA: Methoxypropyl acetate, solvent.

BAC: n-butyl acetate, solvent.

Byk 300: Leveling agent, from BYK.

Baysilonöl OL, 10% in BAC: Leveling additive, from Borchers.

Tinuvin 384-2: 95% benzenepropanoic acid, mixture of esters of branched and linear carboxylic esters of 3-(2H-benzotriazol-2-yl)-5-(1,1-dimethylethyl)-4-hydroxy-, 5% 1-methoxy-2-propyl acetate, UV absorber, from Ciba Speciality Chemical Inc.

Tinuvin 292 HP: HALS derivate, mixture of bis(1,2,2,6,6-pentamethyl-4-piperidinyl)sebacate and methyl 1,2,2,6,6-pentamethyl-4-piperidinyl)sebacate, about 100% strength, from Ciba Speciality Chemical Inc.

Butoxyl: 3-methoxybutyl acetate,

BGA: n-butyl glycol acetate,

Dipentene: Solvent, from Fluka

Solvesso 100: Solvent, from Exxon MobileChemical

III.2. Production of Surface Coating Systems According to the Invention

The surface coating components were mixed in stoichiometric amounts based on isocyanate and hydroxyl groups, i.e. the ratio of NCO:OH groups was equimolar (index: 100).

The polymers PC.1 to PC.3 according to the invention were used as 50% strength by weight solution in n-butyl acetate.

The components of the respective surface coating system according to the invention (see table 2) were mixed with one another in a twist-off bottle while stirring with a spatula and addition of the spraying dilution (see table 3) until a spraying viscosity of 18 seconds running-out time measured using the DIN 4 cup in accordance with DIN 53211 had been reached.

TABLE 2

Composition of the surface coating systems L.1 (comparative experiment) and L.2 to L.7 (according to the invention); figures in parts by weight:

| Raw materials | Blank | L.1 | L.2 | L.3 | L.4 | L.5 | L.6 | L.7 |
|---|---|---|---|---|---|---|---|---|
| Polyacrylate polyol | 87 | 87 | 87 | 87 | 87 | 87 | 87 | 87 |
| Polyisocyanate | 17.79 | 18 | 17.8 | 17.8 | 17.8 | 17.8 | 17.79 | 17.79 |
| MPA | 5 | 5 | 5 | 5 | 5 | 5 | 5 | 5 |
| BAC | 5.26 | 5.3 | 5.26 | 5.26 | 5.26 | 5.26 | 5.26 | 5.26 |
| Byk 300 | 0.3 | 0.3 | 0.3 | 0.3 | 0.3 | 0.3 | 0.3 | 0.3 |
| Baysilonöl OL | 1 | 1 | 1 | 1 | 1 | 1 | 1 | 1 |
| Tinuvin 384-2 | — | 0.7 | 0.74 | 0.74 | 0.74 | 0.74 | 0.74 | 0.74 |
| Tinuvin 292 HP | — | 0.7 | | | | | | |
| PC.1 | — | | 1.4 | | | | 2.8 | |
| PC.2 | — | | | 1.4 | | | 2.8 | |
| PC.3 | — | | | | 1.4 | | | 2.8 |
| Spraying dilution | | | | To a spraying viscosity of 18 seconds | | | | |

TABLE 3

Composition of the spraying dilution (figures in parts by weight):

| | |
|---|---|
| 7 | Butoxyl |
| 7 | Xylene |
| 43 | BAC |
| 31 | BGA |
| 10 | Dipentene |
| 2 | Solvesso 100 |

III.3. Experimental Procedure for Testing the Surface Coatings Under Artificial Weathering In the spraying booth, the adjusted surface coating system (clear coating) was introduced through a gauze into the paint container of the Satajet 2000 HVLP spray gun and applied at an air pressure of 2 bar using one cross pass to sample plates from VWR International GmbH, size 68 mm×60 mm, front side printed white. The sprayed sample plates were dried in air at room temperature for 30 minutes and then baked at 80° C. in a convection oven. Tests on the coating film were carried out on the white part of the plate. After the sample plates had been cooled, the gloss of the coating film was measured at 20° or 60° using the gloss measuring instrument from Byk Gardner, micro TRI-gloss. The yellow value was then measured using the Spectraflash 600 from Data Color. The yellow values and Y 1313 values (Yellowness Index) were measured. The sample plates were then exposed to weathering for up to 2000 hours. The weathering test was carried out using the test method SAE J 1960 (CAM 180) on the ATLAS CI 35A instrument. The gloss and yellow values and Yellowness Index were measured again after weathering.

TABLE 4

Measured values of weathering trial, irradiation after 0 hours (part a) and after 3000 hours (part b)

|  | Blank | L.1 | L.2 | L.3 | L.4 | L.5 | L.6 | L.7 |
|---|---|---|---|---|---|---|---|---|
| (Part a) | | | | | | | | |
| 20° gloss | 81 | 82 | 83.5 | 81.5 | 81 | 81 | 82 | 80.5 |
| 60° gloss | 92 | 92 | 92.5 | 93 | 91 | 92.5 | 92 | 92 |
| Yellow value | −2.37 | −1.08 | −1.58 | −0.76 | −0.87 | −1.65 | −1.27 | −1.34 |
| YI313 | −0.67 | 0.50 | 0.05 | 0.80 | 0.71 | −0.02 | 0.34 | 0.19 |
| (Part b) | | | | | | | | |
| 20° gloss | 73 | 74 | 73 | 74 | 74 | 69 | 70.5 | 69.5 |
| 60° gloss | 85 | 85 | 87.5 | 86.5 | 87.5 | 84 | 86 | 86 |
| Yellow value | −6.24 | −4.83 | −4.47 | −4.14 | −3.86 | −4.29 | −4.10 | −4.73 |
| YI313 | −4.12 | −2.52 | −2.58 | −2.29 | −2.02 | −2.41 | −2.25 | −2.82 |

The gloss values were determined at 20° and at 60° (also referred to as "20° gloss" and "60° gloss", respectively).

The invention claimed is:

1. A mixture, which comprises polyoxymethylene, and a hyperbranched polycarbonate comprising a stabilizing group, obtained by a process comprising reacting:
   (a) a compound comprising at least three alcoholic hydroxyl groups per molecule with
   (b) a reagent of formula I:

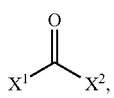

(c) and a reagent of formula $X^3$-$(A^1)_m$-$X^4$, wherein:
   $X^1$ and $X^2$ are identical or different and are each independently a halogen, $C_1$-$C_{10}$-alkoxy, $C_6$-$C_{10}$-aryloxy, or O—C(=O)-halogen;
   $X^3$ is OH, SH, $NH_2$, NH—$C_1$-$C_4$-alkyl, isocyanate, epoxy, COOH, $COOR^{12}$, C(=O)—O—C(=O), C(=O)—Cl;
   $R^{12}$ is a $C_1$-$C_4$-alkyl or $C_6$-$C_{10}$-aryl;
   $A^1$ is a spacer or a single bond;
   m is zero or one; and
   $X^4$ represents a group represented by formula IIa or IIb

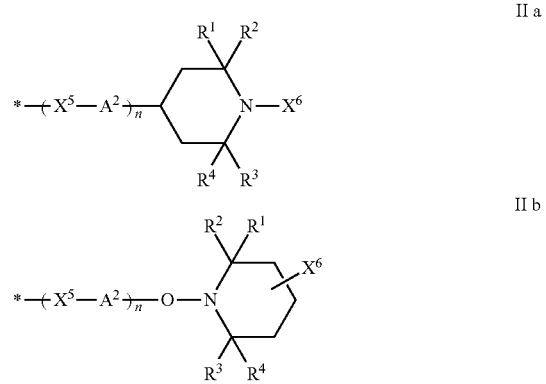

wherein:
   $R^1$, $R^2$, $R^3$, and $R^4$ are identical or different and are each independently a $C_1$-$C_{10}$-alkyl or $C_3$-$C_{10}$-cycloalkyl;
   $X^5$ is an oxygen atom, a sulfur atom, an NH group, an N—($C_1$-$C_4$-alkyl) group, a carbonyl group;
   $A^2$ is a single bond or a spacer;
   n is zero or one;
   $X^6$ is hydrogen, oxygen, O—$C_1$-$C_{19}$-alkyl, $C_1$-$C_{12}$-alkyl, $C_2$-$C_{18}$-acyl, or aryloxy-carbonyl comprising from 7 to 12 carbon atoms;
   said components (a), (b), and (c) are each simultaneously present in a mixture prior to and during said reacting,
   said component (a) is present in an amount of from 10 to 59 mol % based on the total reaction mixture;
   said component (b) is present in an amount of from 40 to 60 mol % based on the total reaction mixture; and
   said component (c) is present in an amount of from 1 to 40 mol % based on the total reaction mixture.

2. The mixture of claim 1, wherein $A^1$ is a single bond or a $C_1$-$C_{10}$-alkylene group as the spacer.

3. The mixture of claim 1, wherein $A^1$ is a single bond.

4. The mixture of claim 1, wherein $A^1$ is a $C_1$-$C_{10}$-alkylene group as the spacer.

5. The mixture of claim 1, wherein the hyperbranched polycarbonate has a dynamic viscosity in the range from 100 to 150,000 mPa·s determined at 23° C.

6. The mixture of claim 1, wherein the hyperbranched polycarbonate has a dynamic viscosity in the range from 100 to 100,000 mPa·s determined at 23° C.

7. The mixture of claim 1, wherein the hyperbranched polycarbonate has a glass transition temperature $T_g$ in the range from −70° C. to 10° C.

8. The mixture of claim 1, wherein the reacting further comprises (d) a compound comprising two alcoholic hydroxyl groups per molecule,
   wherein, prior to the reacting, the compound (a) is in a mixture with the compound (d).

9. The mixture of claim 1, wherein $R^1$, $R^2$, $R^3$, and $R^4$ are identical.

10. The mixture of claim 1, wherein $R^1$, $R^2$, $R^3$, and $R^4$ are methyl.

11. The mixture of claim 1, wherein $X^6$ is a methoxy or ethoxy.

12. The mixture of claim 1, wherein the polyoxymethylene has a polydispersity of from 2 to 15.

13. The mixture of claim 1, wherein the polyoxymethylene has a polydispersity of from 2.5 to 12.

14. The mixture of claim 1, wherein the polyoxymethylene has a polydispersity of from 3 to 9.

15. The mixture of claim 1, wherein said component (a) is present in an amount of from 10 to 55 mol % based on the total reaction mixture.

16. The mixture of claim 1, wherein said component (a) is present in an amount of from 10 to 49 mol % based on the total reaction mixture.

17. The mixture of claim 1, wherein said component (b) is present in an amount of from 45 to 55 mol % based on the total reaction mixture.

18. The mixture of claim 1, wherein
said component (a) is present in an amount of from 10 to 55 mol % based on the total reaction mixture; and
said component (b) is present in an amount of from 45 to 55 mol % based on the total reaction mixture.

19. The mixture of claim 1, wherein
said component (a) is present in an amount of from 10 to 49 mol % based on the total reaction mixture; and
said component (b) is present in an amount of from 45 to 55 mol % based on the total reaction mixture.

20. The mixture of claim 1, wherein at least one compound having at least three hydroxyl groups per molecule (a) is selected from the group consisting of glycerol and (HO—$CH_2)_3X^7$, unalkoxylated or alkoxylated by from one to one hundred $C_2$-$C_4$-alkylene oxide units per hydroxyl group, where $X^7$ is a nitrogen atom or a C—$R^6$ moiety, wherein $R^6$ is hydrogen or a $C_1$-$C_4$-alkyl group.

\* \* \* \* \*